April 24, 1956 — G. H. McKENNE — 2,742,940
TRACTION DEVICE FOR VEHICLES
Filed May 8, 1953 — 2 Sheets-Sheet 1

INVENTOR.
GEORGE H. McKENNE,
BY
McMorrow, Berman & Davidson
ATTORNEYS

April 24, 1956  G. H. McKENNE  2,742,940
TRACTION DEVICE FOR VEHICLES
Filed May 8, 1953  2 Sheets-Sheet 2
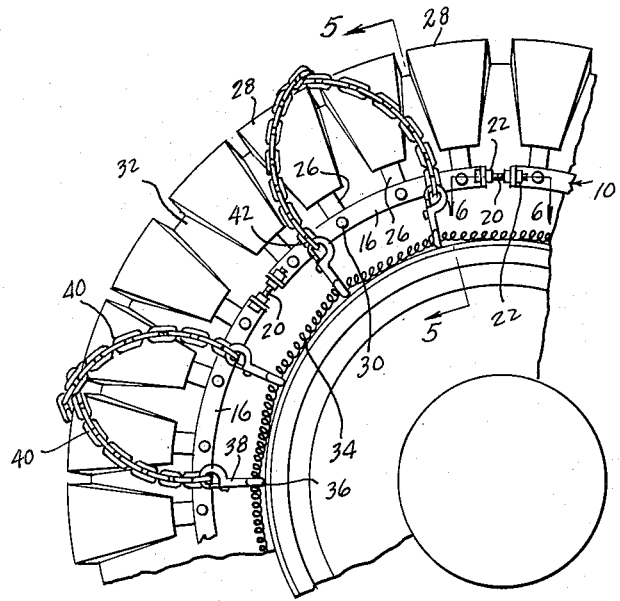
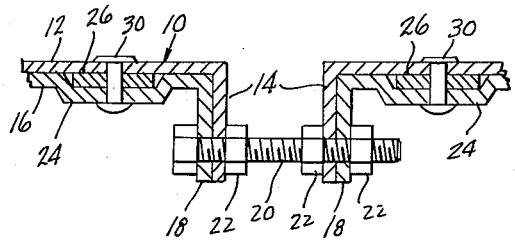
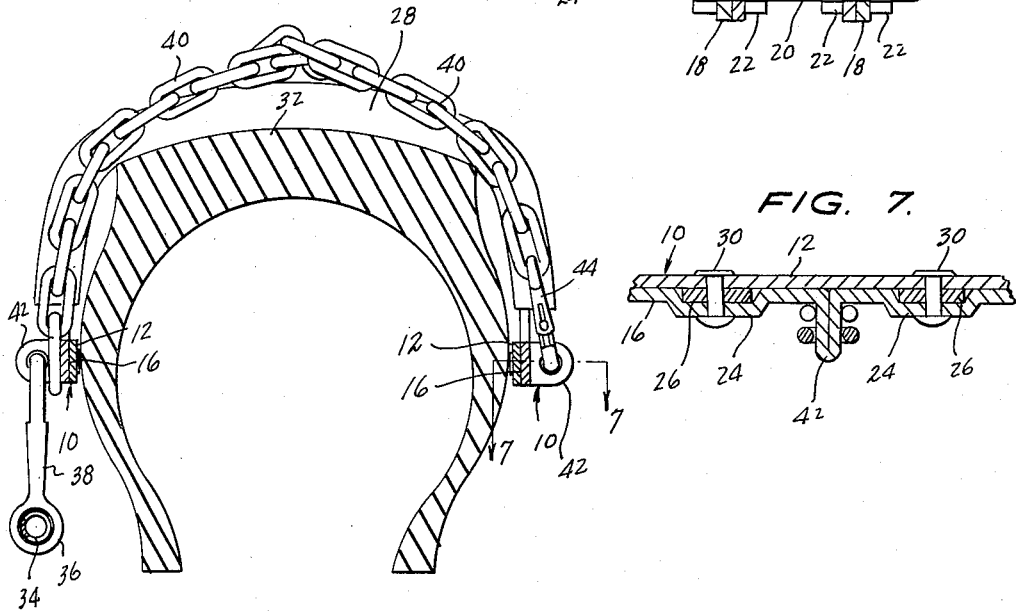
INVENTOR.
GEORGE H. McKENNE,
BY
McMorrow, Berman + Davidson
ATTORNEYS United States Patent Office 2,742,940
Patented Apr. 24, 1956

2,742,940

TRACTION DEVICE FOR VEHICLES

George H. McKenne, McGill, Nev.

Application May 8, 1953, Serial No. 353,711

3 Claims. (Cl. 152—218)

This invention relates to improvements in traction devices for vehicle wheels.

In many sections of the country, anti-skid chains or equivalent traction devices are necessary, at different times during the winter months. In many instances, the necessity for using said anti-skid chains is eliminated in a short time. As a result, it is necessary that vehicle operators apply said anti-skid chains on frequent occasions, and remove the chains almost immediately, due to clearing of the roads. This, as will be appreciated, is inconvenient and time consuming.

In view of the above, the main object of the present invention is to provide traction devices for vehicles which can be applied to vehicle wheels at the beginning of the winter months, and can be left upon the wheels throughout the snowy and icy season.

Another object of importance is to provide traction devices as described in which are incorporated a main traction assembly and a secondary traction assembly, the main assembly including a plurality of spaced cleats extending transversely of a tire casing, the secondary traction assembly including a plurality of chain elements which are normally recessed in the spaces between the cleats so as to be inoperatively disposed, said chain elements being movable out of the spaces between the cleats so as to overlie the cleats, whenever snowy or icy conditions arise.

Another object of importance is to provide traction devices of the character referred to, wherein the main traction assembly provides a heavy, cleated tread for the tire casings, capable of use as either an ordinary tread or as a snow and mud tread, the flexible chain elements, when operatively disposed relative to said cleats, being adapted to cooperate with the cleats in adding to the traction already afforded by the heavy cleats.

Another object of importance is to provide a traction device of the character referred to which, when applied to a vehicle wheel, will not mar or damage the tire, and will, further, be adjustable to operative or inoperative positions in minimum time and with minimum difficulty.

Other objects will appear from the following description, the claims appended thereto, and from the annexed drawings, in which like reference characters designate like parts throughout the several views, and wherein:

Figure 4 is a view similar to Figure 1, portions being broken away, the chain elements being operatively disposed for use over snow or ice;

Figure 5 is a transverse sectional view on line 5—5 of Figure 4, on an enlarged scale;

Figure 6 is a detail sectional view, the scale being greatly enlarged, taken on line 6—6 of Figure 4; and Figure 7 is a detail sectional view, the scale being greatly enlarged, taken substantially on line 7—7 of Figure 5.

Figure 1:
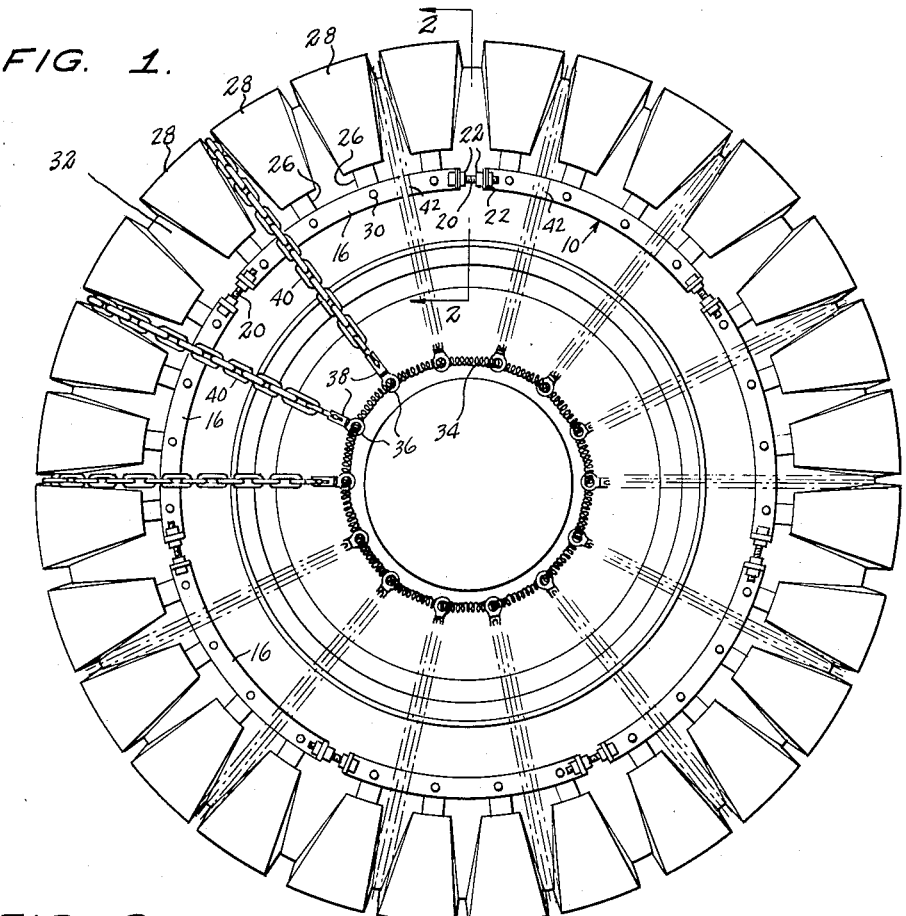
Figure 1 is a side elevational view of a vehicle wheel equipped with a traction device formed in accordance with the present invention, the flexible chain elements of said device being inoperatively disposed.
Figure 2:
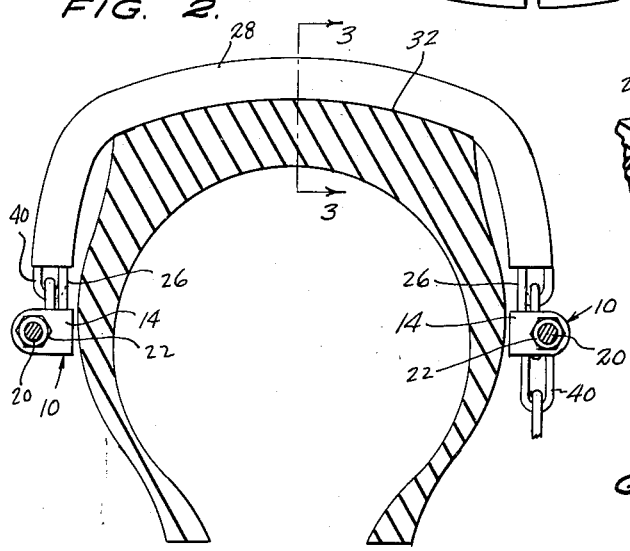
Figure 2 is an enlarged transverse sectional view on line 2—2 of Figure 1.
Figure 3:
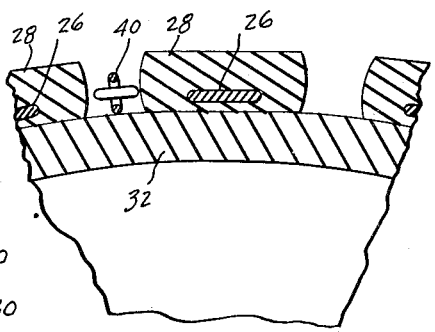
Figure 3 is an enlarged sectional view taken on line 3—3 of Figure 2.

Referring to the drawings in detail, the illustrated device comprises a pair of support rings 10, 10, one of said rings being disposed against one side of a tire casing, and the other ring being disposed against the other side. The rings are of identical, though opposite formation, and hence, the description of one ring will suffice for both.

Each support ring 10 includes a plurality of inner segments 12.

Each segment 12 is formed, at its opposite ends, with outwardly and laterally projected ears 14 (Figure 6).

Overlying the inner segments 12 are outer ring segments 16, having ears 18 at their respective ends, the ears 18 and 14 being disposed in contact with one another and being provided with registering apertures receiving bolts 20, the bolts 20 being connected to the respective ring segments by means of lock nuts 22.

The bolts 20 are provided to permit adjustment of the ring 10, as to the diameter thereof, it being understood that the bolts 20, when tightened, will contract the ring 10 to an extent sufficient to cause said ring to engage firmly against the tire casing, while at the same time not damaging or otherwise marring the surface of said casing.

In the outer ring segments 16, offsets 24 are formed, so as to define spaces in which are disposed the opposite ends of flat cross bars 26, said cross bars 26 being embedded, for the greatest part of their length, in rubber cleats 28. The cleats 28 are of tapered formation at their opposite ends, said cleats being spaced apart throughout the circumference of the vehicle tire and being extended across the tread of said tire. Thus, the cleats 28 will themselves provide a snow or mud tread which will provide substantial traction.

The ends of the cross bars 26 are permanently connected to the respective rings 10, by means of rivets 30 or equivalent fastening elements. It will be understood that welding or other means could be employed, if desired, for the purpose of securing the cross bars fixedly to the respective rings 10.

A tire casing has been designated by the reference numeral 32, and is of conventional construction.

A secondary assembly comprises a tension ring 34, said tension ring 34 being formed from a suitable length of coil spring material and being disposed against the outer side of the vehicle wheel, and includes a plurality of flexible chain elements, said elements being connected to the tension ring 34. To provide a detachable connection for each element to the tension ring, I utilize releasable connecting links including eyes 36 through which the ring 34 extends, said eyes 36 being formed at the inner ends of the releasable connecting links 38, said connecting links 38 being attached to the adjacent end links of chain elements 40. The elements 40 are arranged in pairs, and normally are disposed as in Figure 1. As will be noted from Figure 1, the chain elements of each pair are extended transversely of the tire tread, and are recessed in the spaces between selected cleats 28. In this position of the chain elements 40, said elements will be inoperatively disposed, and it will be observed that the chain elements 40 will not, as a result, interfere with normal driving.

Formed upon the outer ring segments 16 are outwardly directed lugs 42 (Figure 7), the lugs 42 having apertures. The ring 10 which is disposed against the side of the casing opposite from the side against which tension ring 34 is positioned, has its lugs 42 connected to releasable connecting elements 44, said elements 44 being connected to one end of the respective chain elements 40. The purpose of using releasable elements 44 is to permit any selected chain member to be removed completely, and replaced in the event it becomes broken or needs repair.

As previously mentioned, the chain members 40 will be disposed as shown in Figure 1, under normal driving conditions. However, assuming that snowy or icy conditions are encountered, it is merely necessary that the elements of each pair be detached from their associated connecting links 38, and crossed as in Figure 4. Thereafter, the elements are reattached to the links 38, and due to their new positions, in which they overlie the cleats 28, they will resiliently expand the tension ring 34.

Before the elements 40 are reattached, selected links of said elements are positioned over the lugs 42 of that ring 10 disposed against the outer side of the tire casing, that is, that side of the tire casing against which ring 34 is positioned. Then, the connecting links 38 are extended through the apertures of the lugs engaging the chain elements, in the manner shown in Figure 5, thereby locking the chain elements in their crossed position.

It will be readily seen that traction devices of the type illustrated and described can be left upon the vehicle from the beginning of the winter season to the end of said season, without necessity of removal at any time. During good driving periods, the traction device appears as in Figure 1. During bad driving periods, it appears as in Figure 4.

Should snowy conditions be encountered, it is merely necessary that the chain elements be crossed as shown, and held in proper position by the lugs 42 cooperating with the connecting links 38. The chain elements will now be disposed out of the spaces between the cleats 28, and will cooperate with the cleats in providing the desired traction for the vehicle wheels. When, subsequently, the roads are cleared and good driving conditions again exist, it is merely necessary that the connecting links 38 be detached from the lugs 42, and the chain elements reinserted in the spaces between their associated cleats 28.

It is believed apparent that the invention is not necessarily confined to the specific use or uses thereof described above, since it may be utilized for any purpose to which it may be suited. Nor is the invention to be necessarily limited to the specific construction illustrated and described, since such construction is only intended to be illustrative of the principles of operation and the means presently devised to carry out said principles, it being considered that the invention comprehends any minor change in construction that may be permitted within the scope of the appended claims.

What is claimed is:

1. In a vehicle wheel tire traction device, a first assembly comprising support rings for engaging opposite side walls of a tire, cleats connected at opposite ends to the support rings and arranged to extend across the tread of a tire, and spaced from each other around the tread, a second assembly comprising a plurality of flexible chains arranged to lie across a tire tread in the spaces between the cleats, said chains having first ends secured to one of said support rings and second ends unsecured to the other support ring, and a resilient tension ring adapted to be positioned at the side of a wheel opposite from said one support ring and to which the said second ends of the chains are secured, said tension ring being stretchable to enable removal of chains from the spaces between cleats and positioning thereof across said cleats.

2. In combination, a vehicle wheel having a tire thereon, said tire including side walls and a tread, and said wheel having first and second sides, a first support ring engaging the tire side wall at the first side of the wheel, a second support ring engaging the tire side wall at the second side of the wheel, cleats extending across the tire tread and secured at opposite ends to the support rings, the cleats being spaced from each other around the tread, flexible chains having first and second ends, the first ends of the chains being secured to the first support ring and the second ends of the chains being unsecured to the second support ring, and a stretchable tension ring at the second side of the wheel to which the second ends of the chains are secured.

3. In combination, a vehicle wheel having a tire thereon, said tire including side walls and a tread, and said wheel having first and second sides, a first support ring engaging the tire side wall at the first side of the wheel, a second support ring engaging the tire side wall at the second side of the wheel, cleats extending across the tire tread and secured at opposite ends to the support rings, the cleats being spaced from each other around the tread, flexible chains having first and second ends, the first ends of the chains being secured to the first support ring and the second ends of the chains being unsecured to the second support ring, and a stretchable tension ring at the second side of the wheel to which the second ends of the chains are secured, said tension ring being smaller in diameter than the support rings and disposed concentrically thereof, with portions of the chains extending across the second support ring to said tension ring.

References Cited in the file of this patent

UNITED STATES PATENTS

| 953,673 | Weed | Mar. 29, 1910 |
| 1,456,729 | Fraser | May 29, 1923 |
| 2,537,231 | Necrason | Jan. 9, 1951 |